US006121915A

United States Patent [19]

Cooper et al.

[11] Patent Number: 6,121,915
[45] Date of Patent: Sep. 19, 2000

[54] RANDOM NOISE AUTOMOTIVE RADAR SYSTEM

[75] Inventors: George R. Cooper, Alta Loma; Jimmie D. Huff, Claremont; Alexander Niechayev, Riverside, all of Calif.

[73] Assignee: Raytheon Company, Lexington, Mass.

[21] Appl. No.: 08/982,999

[22] Filed: Dec. 3, 1997

[51] Int. Cl.[7] .......... G01S 13/93

[52] U.S. Cl. .......... 342/70

[58] Field of Search .......... 342/70, 71, 72, 342/109, 128, 145

[56] References Cited

U.S. PATENT DOCUMENTS 5,724,041 3/1998 Inoue et al. .......... 342/70
5,731,778 3/1998 Nakatani et al. .......... 342/70

*Primary Examiner*—Daniel T. Pihulic
*Attorney, Agent, or Firm*—David W. Collins; Leonard A. Alkov; Glenn H. Lenzen, Jr.

[57] ABSTRACT

An automotive radar system for use with an automotive control system such as a collision avoidance or smart cruise control system, for example. A wide-bandwidth, random noise signal generated at an RF frequency that is transmitted by a transmitter and reflected from targets in the vicinity of the system. The random noise modulation is sampled prior to transmission in a noise source sampler and this sampled image of the transmitted noise is stored and passed through a series of delay stages that are formed in a correlator. The noise signal reflected from objects is processed by a homodyne receiver and also sampled in a receiver sampler. The noise samples from the signal return are passed to the correlator where they are cross correlated with the delayed images of the transmit noise. The output from the correlator for each unit of delay (range gate) is processed in a digital signal processor to find the range and closing velocity (Doppler frequency) of objects in the field of view. The output (range gate) of the correlator where the delay of the sampled transmit modulation equals the transmit delay of the signal transmitted from the radar system to the object and back, contains the range and closing velocity of the objects. At delays (ranges) where there are no objects to reflect the signal, the outputs of the correlator contain noise. Output signals from the digital signal processor are coupled to the automotive control system which processes the output signals to control the vehicle to avoid collision with the detected targets.

17 Claims, 5 Drawing Sheets

RANDOM NOISE AUTOMOTIVE RADAR SYSTEM

BACKGROUND

The present invention relates generally to radar systems, and more particularly, to random noise based automotive radar systems that are particularly well adapted for use in vehicle applications such as collision avoidance and smart cruise control systems, and the like.

There are many techniques being studied for use as automotive collision-avoidance or smart cruise control devices. Types of waveform modulations presently in use include, but are not limited to, pseudo-random noise sequences (binary sequences that have many characteristics of a noise waveform but which repeat after a given time interval), frequency modulation continuous wave (FMCW or swept-frequency or chirp waveforms), and medium pulse repetition frequency (where the transmit waveform modulation is a train of pulses, and range is determined by the delay between transmission and reception of the pulse).

All of these waveforms are deterministic and periodic, in that they repeat in time. This sets the conditions for fratricide; i.e., the signal generated by another similarly-equipped vehicle enters the parent vehicle receiver and gives a false indication of the presence, range, and velocity of an object. For example, if numerous vehicles are present in a relatively high-traffic-density situation, all equipped with FMCW collision-avoidance devices that operate in the same general frequency band with similar waveform characteristics (e.g., sweep rate, sweep interval, etc.), then the probability of fratricide increases very rapidly with the number of vehicles involved.

More particularly, many adaptive cruise control systems discussed in the literature utilize frequency modulated continuous wave (FMCW) waveforms, with various algorithms to determine the range to target vehicles. The repetitive nature of these waveforms make them susceptible to fratricide from other similar radar systems operating in the vicinity. In such systems, direct radiation coming from a similar radar system in an approaching vehicle, or the reflection from a target entering a receiving antenna of a vehicle other than the one that transmitted the signal, generate erroneous detection signals. In particular, it has been determined that the number of noninterfering FMCW waveforms in a given operating bandwidth is small in comparison to the number of vehicles on a busy roadway.

Another shortcoming relating to the use of FMCW signals is that multiple FM slopes are often used to resolve range ambiguities. Therefore, it is difficult to resolve more than a small number of separate target (automobiles, trucks, etc.) returns without generating "ghost" targets. Consequently, apparent returns from ranges at which no target exists are caused by large targets at ranges greater than the ambiguous range. Since the random noise waveform never repeats in time, the system exhibits either a thumbtack ambiguity function that has no ambiguities in range or velocity (Doppler), or a ridge ambiguity function that has Doppler ambiguities but no range ambiguities. For a system having a ridge ambiguity function, the Doppler ambiguities can be set such that the first ambiguity is greater than any expected closing velocity; e.g., 200 mph. For a system having either function, there are no range ghosts that must be resolved. This means that the range and velocity of any number of targets can be resolved in a single processing dwell.

Accordingly, it is an objective of the present invention to provide for improved random noise based radar systems for use in collision avoidance, smart cruise control, and other automotive applications.

SUMMARY OF THE INVENTION

To meet the above and other objectives, the present invention provides for an automotive warning sensor or radar system that is well-suited for use in vehicular applications that examines a designated field of view in the vicinity of a parent vehicle that corresponds to a given sector in front of, beside, or behind the vehicle, to determine the range and closing velocity of objects, such as other vehicles, in that designated field of view. When the radar system is used in an automotive environment, and particularly when it is used as a front end radar system or sensor that is part of a smart cruise control or collision avoidance system, the present invention provides a driver of the vehicle with information warning of potential collision situations (e.g., a vehicle in front that is suddenly slowing down such that a rear-end accident may be imminent if conditions are not modified).

One novel feature of the present automotive radar system is that a wide-bandwidth, random noise signal is used to modulate a radio frequency (RF) carrier. Purely random noise never repeats, which is advantageously exploited by the automotive radar system. In the high-traffic-density situation, it is extremely unlikely that a signal from another vehicle will be detected and processed by the parent vehicle. Instead, potentially interfering signals are seen as noise. Because the random noise waveform yields an unambiguous range measurement, there are no ghost targets that must be resolved when there are returns from multiple vehicles.

The random noise modulation is sampled prior to transmission and this sampled image of the modulation is stored and passed through a series of delay stages in a high-speed correlator application specific integrated circuit (ASIC) that is at the heart of the signal processing performed in the automotive radar system. I and Q (in-phase and quadrature) samples of both the transmit and receive signals are taken. In addition, all signal processing through the post signal processor uses I and Q processing to provide both magnitude and sense (incoming or outgoing) of the velocities of objects in the radar field of view. The use of I and Q processing is well understood by those skilled in the art of digital signal processing. The modulation on the signal reflected from objects in the field of view is also sampled. The modulation samples from the signal return are passed to the correlator ASIC where they are cross-correlated with delayed images of the sampled transmit modulation.

Thus, the detection process performed in the correlator ASIC is coherent upon receive even though the transmit signal is purely random. The output from the correlator ASIC for each unit of delay (range gate) of interest is processed using conventional signal processing techniques to find the range and closing velocity (Doppler frequency) of any other objects (vehicles) in the field of view. The output of the correlator ASIC (range gate) where the delay of the sampled transmit modulation equals the transmit delay of the signal transmitted from the parent vehicle to the object and back to the parent vehicle, contains the range and closing velocity of the object. At delays (ranges) where there are no objects to reflect the signal, the outputs of the correlator ASIC contain noise. If processing of the data indicates a potential collision situation, the system warms the driver via any chosen technique such as a warning alarm or performs other actions such as braking the vehicle automatically to avoid a collision.

The present invention provides for the use of random noise modulation in vehicle collision-avoidance or adaptive cruise control sensors or systems to provide warning as to the unambiguous velocity and range of other vehicles or objects in a predetermined field of view, with virtually no possibility of fratricide by waveforms emitted by other vehicles using similar warning devices or more conventional sensors such as FMCW devices. Thus, the present invention may be advantageously employed in application involving automotive collision-avoidance warning systems or adaptive cruise control systems. Typical applications include private and commercial automobiles, trucks, buses and motorcycles. Other applications include systems for use on aircraft, trains, and bicycles, for example, or obstacle avoidance systems for use by the blind.

The techniques employed in the present invention enable the development of a low cost, adaptive cruise control system that is virtually free of any potential fratricide problems (disruption by other similar systems operating in the same vicinity). The cost to produce the automotive radar system is relatively low because there are no expensive component assemblies in the transmitter, in contrast to an FMCW system, for example, in which its voltage-controlled oscillator is often complex and difficult to produce. The random noise automotive radar system provides simultaneous and rapid measurement of both range and velocity of objects in the operational field of view of the system. The automotive radar system uses a wide-band, nondeterministic waveform. Therefore, the number of objects with different ranges and velocities that can be detected simultaneously is only limited by the speed and complexity of the signal processing performed in the system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
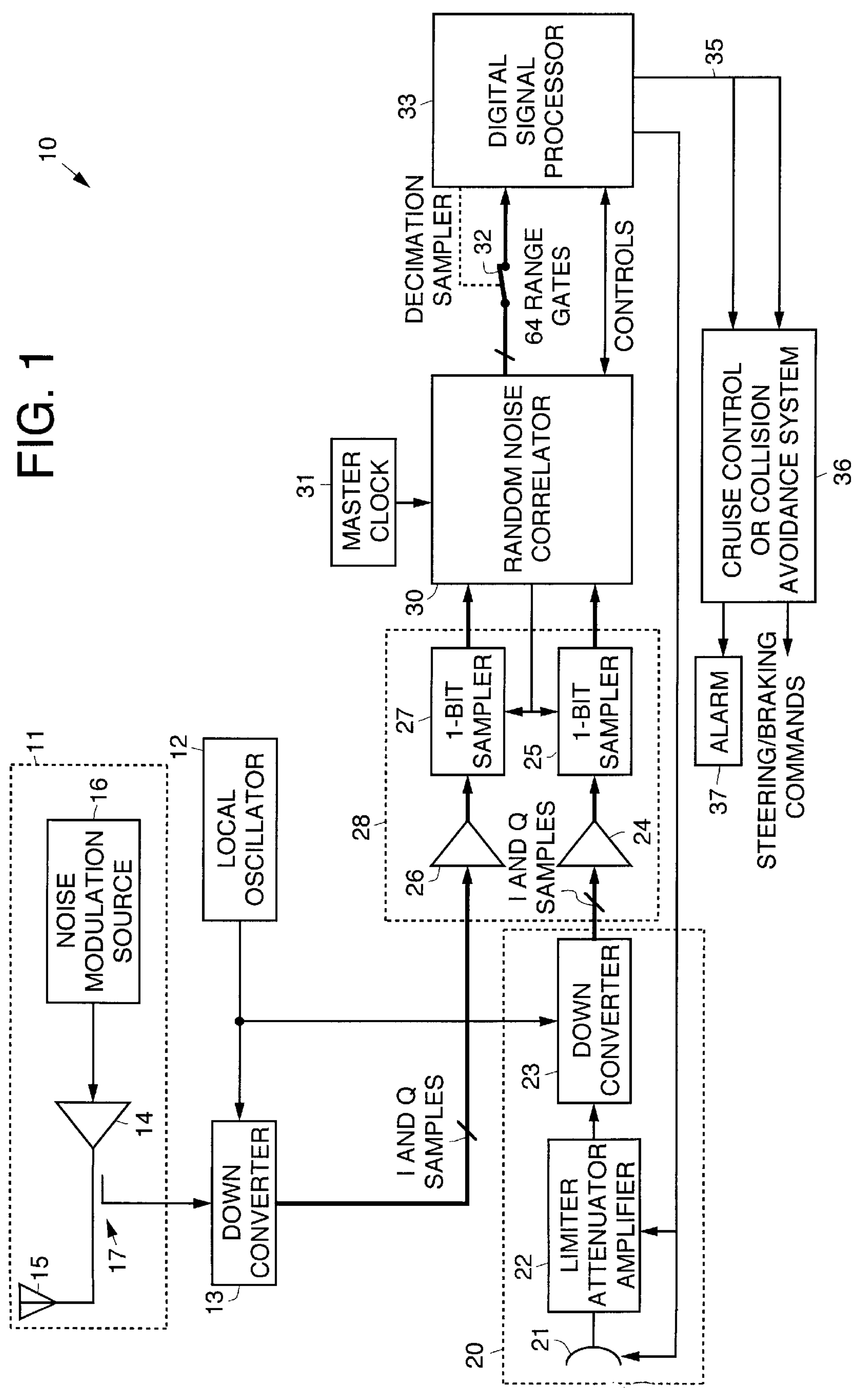
FIG. 1 illustrates a functional block diagram of an exemplary random noise automotive radar system in accordance with the principles of the present invention that may be used for automotive radar applications as part of a vehicle collision-avoidance or adaptive cruise control system.

Referring to the drawing figures, FIG. 1 illustrates a functional block diagram of an exemplary random noise automotive radar system 10 in accordance with the principles of the present invention. The random noise automotive radar system 10 may be used as a front end of an automotive control system 36, such as a vehicle collision-avoidance or adaptive cruise control system 36, for example. The present random noise automotive radar system 10 thus replaces conventional FMCW radar sensors that are typically used with collision avoidance and smart cruise control systems 36.

The random noise automotive radar system 10 is comprised of a transmitter 11 that includes a noise source 16 which is coupled by way of a transmit power amplifier 14 to a transmit antenna 15. The random noise source 16 has a 250 MHz bandwidth in the exemplary embodiment, and is centered at the transmit frequency. This noise source 16, which is centered at the transmit frequency, can be implemented by several methods that are well-understood by those skilled in the art.

The random noise automotive radar system 10 includes a homodyne receiver 20 that includes a receive antenna 21 that is coupled by way of a limiter-attenuator-amplifier network 22 to a down converter 23. An output of the transmit power amplifier 14 is coupled by way of a coupler 17 to a down converter 13. The transmit and receiver down converters 13, 23 are driven by a local oscillator 12 centered at the transmit frequency. The output of the homodyne receiver down converter 23 is coupled by way of receiver video amplifier 24 and a receiver one bit sampler 25 that is part of a single bit analog to digital conversion means 28 to a complex random noise correlator 30, or correlator 30, in accordance with the present invention. The output of the down converter 13 is also coupled by way of a noise source video amplifier 26 and a noise source one bit sampler 27 that is part of the single bit analog to digital conversion means 28 to the correlator 30.

A master clock 31 is coupled to the correlator 30. The output of the correlator 30 comprises a plurality of range gates (64 for example) that are coupled to a digital signal processor 33. The plurality of range gates are sampled using a plurality of switches 32 under control of the digital signal processor 33. Control signals are also coupled between the correlator 30 and the digital signal processor 33. Control signals are also coupled from the digital signal processor 33 to an attenuation input of the limiter 22 and to the pointing control inputs of the receive antenna 21.

The operation of the random noise automotive radar system 10 is relatively simple and will be discussed with regard to its use in a vehicular application, and particularly its use as a front end of the vehicle collision-avoidance or adaptive cruise control system 36, which are typical automotive control systems 36. The output of the noise source 16 is wideband random noise (250 MHz in this example) centered at a predetermined radio frequency (e.g., 77 GHz. for example, which is one possible band that may be designated for automotive use). The noise-modulated signal is transmitted by way of the transmit antenna 15 after amplification.

A signal return reflected from objects such as other automobiles, trucks, motorcycles, road debris, and the like in the field of view of the receive antenna 21 is converted down to baseband in the homodyne receiver 20. The modulation on the return signal, as well as the transmit modulation, are sampled at a rate equal to twice the bandwidth of the noise modulation (i.e., sampled at the bandwidth in both the I and Q channels) using the receiver one bit sampler 25 and the noise source one bit sampler 27. The samples are passed to the correlator 30, which may preferably be implemented in an application specific integrated circuit (ASIC), for example.

In the implementation shown in FIG. 1, the one bit samplers 25, 27 comprise single bit A/D converters. The respective gain values of the video amplifiers 24, 26 in front of the single-bit samplers 25, 27 are set such that the inputs to the samplers 25, 27 are hard limited on system noise. Although, it may be thought that single-bit sampling would result in a serious reduction in system sensitivity, it can be shown that the overall loss of sensitivity of the automotive radar system 10 is less than 3 dB due to the hard-limiting and the fact that a fixed detection threshold is used in detection algorithms used in the digital signal processor 33 rather than a conventional variable-threshold, constant false alarm rate detector with its inherent loss as is normally required in a detection system. In addition, the present invention may advantageously use analog-to-digital sampling devices 25, 27 with more quantization bits to enhance performance.

Thus, during operation, the random noise signal output by the random noise source 16 is down-converted and sampled prior to transmission by the receiver one bit sampler 27 and this complex (I and Q) sampled image of the modulation is stored and passed through a series of delay stages in the correlator 30. The modulation on the signal reflected from objects in the field of view is also sampled by the one bit sampler 25. The modulation samples from the signal return are processed in the correlator 30 where they are cross-correlated with the delayed images of the sampled transmit modulation.

The detection process performed in the correlator 30 is coherent upon reception even though the transmit signal is random. The output from the correlator 30 for each unit of delay (range gate) of interest is processed using well-known signal processing techniques to find the range and closing velocity (Doppler frequency) of objects (vehicles) in the field of view. The output (range gate) of the correlator 30 where the delay of the sampled transmit modulation equals the transmit delay of the signal from the parent vehicle to the object and back to the parent vehicle, contains the range and closing velocity of the object. At delays (ranges) where there are no objects to reflect the signal, the outputs of the correlator 30 contain noise. If processing of the data indicates a potential collision situation, the automotive radar system 10 may be caused to warn the driver using a warning alarm or perform other actions such as braking the vehicle automatically to avoid a collision.

A custom gallium arsenide ASIC has been designed, implemented, and tested that implements the correlator 30 and which performs the functions described above. Details of the design of the correlator 30 will not be provided herein, which is readily designed by those skilled in the art, but it has been exhaustively tested at clock frequencies in excess of 1 GHz, so the 250 MHz operation does not stress the device. With a 250 MHz bandwidth, technologies other than gallium arsenide can be used to generate this ASIC, or an equivalent random noise correlator may be designed using programmable gate arrays. The correlator 30, as currently configured, can implement as many as 64 complex-input range gates.

Multiple correlators 30 may be cascaded to increase the number of range gates required to meet the requirements of the automotive radar system 10. The ability to handle complex inputs (known as I- and Q-channel processing) enables the determination of correct velocity sense so that positive velocities (vehicles "closing" with respect to the parent vehicle) and negative velocities (the velocity relative to a vehicle "moving away" from the parent vehicle) can be differentiated.

With 250 MHz operation, the width of each range gate is approximately 2 feet. The correlator 30 performs range gating, complex cross-correlation, sampling control and other processing functions on the noise data. The outputs of the correlator 30 are sampled at a lower rate (dependent on the desired velocity coverage of the automotive radar system 10) and are passed to the microprocessor-based signal processor 33 where the outputs of each range gate are processed and examined for the presence of target returns.

Range and Doppler processing of the data output from the correlator 30 is well understood by those skilled in the art and will not be discussed in detail herein. The detection logic as well as final outputs 35 from the automotive radar system 10 are dependent upon the overall system requirements. For a typical application, the outputs 35 from the automotive radar system 10 are passed to the automotive control system 36, such as either the collision avoidance or smart cruise control system 36. for example. The outputs 35 comprise range and relative velocity signals that are input to the automotive control system 36, and which are used to brake or accelerate the vehicle to prevent a collision with an object detected by the automotive radar system 10, or which are processed to activate an alarm 37 that alerts the driver to take action.

Depending upon the system mechanical configuration constraints, there are two related, but different, waveforms that may be used. The first waveform is one in which the transmitted signal is continuous random noise. This waveform provides the best detection capability for a given level of peak transmit power, but it can only be used if the transmit and receive antennas 15, 21 are sufficiently separated in spatial extent so that transmit power "leakage" (often referred to as spillover) into the receive antenna 21 does not degrade detection of the return signal. Details of this waveform and typical sampling waveforms are shown in FIGS. 2 and 3.

Figure 2:
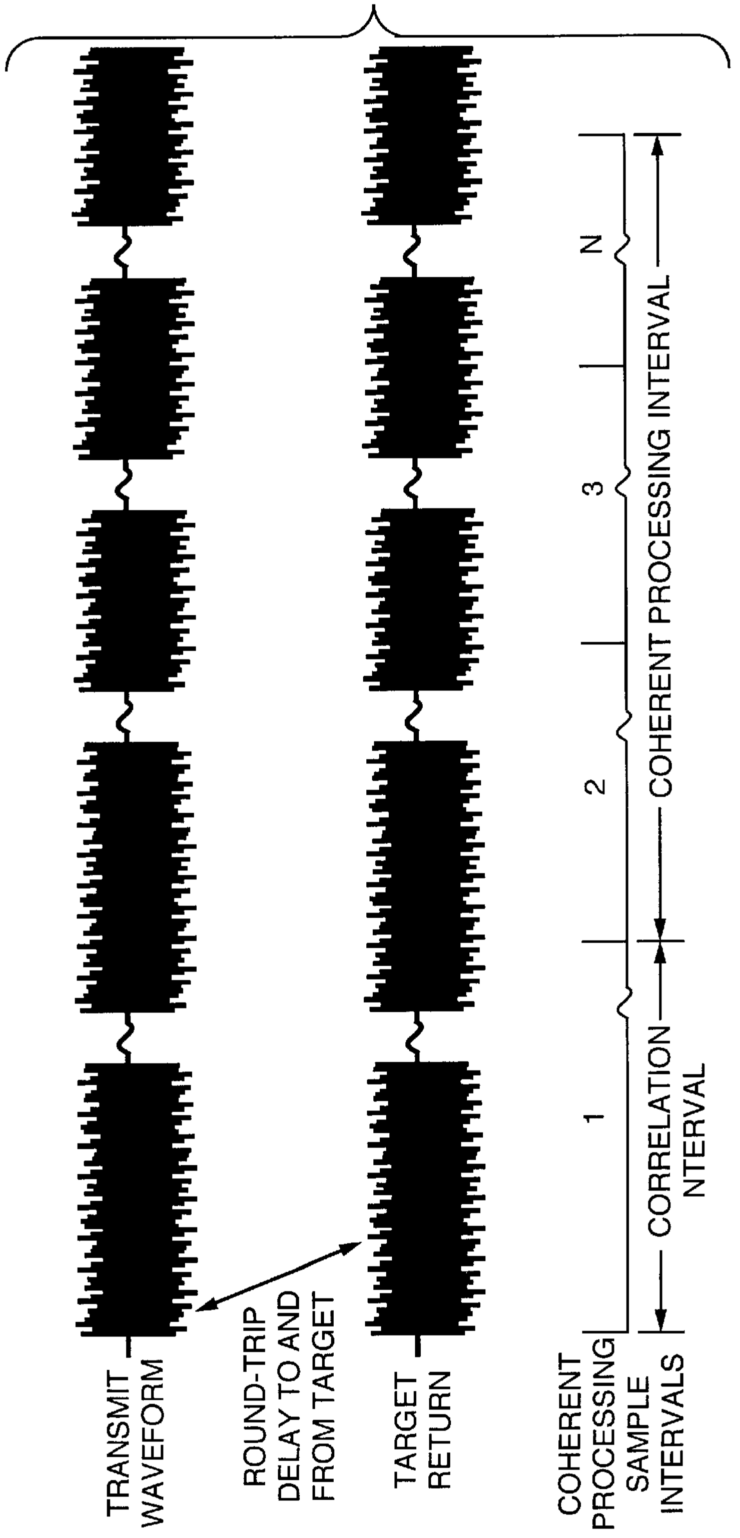
FIG. 2 shows a continuous random noise waveform that may be used in the automotive radar system of FIG. 1.

FIG. 2 shows the random noise transmit and receive waveforms and coherent processing sample intervals. The transmit noise-modulation waveform is sampled prior to transmission and these examples are delayed through a series of digital delays (range gates) and the output of each delay stage is cross-correlated with the sampled modulation on the return signal. FIG. 3 is a detailed enlargement showing this sampling, gating, and correlation process.

Figure 3:
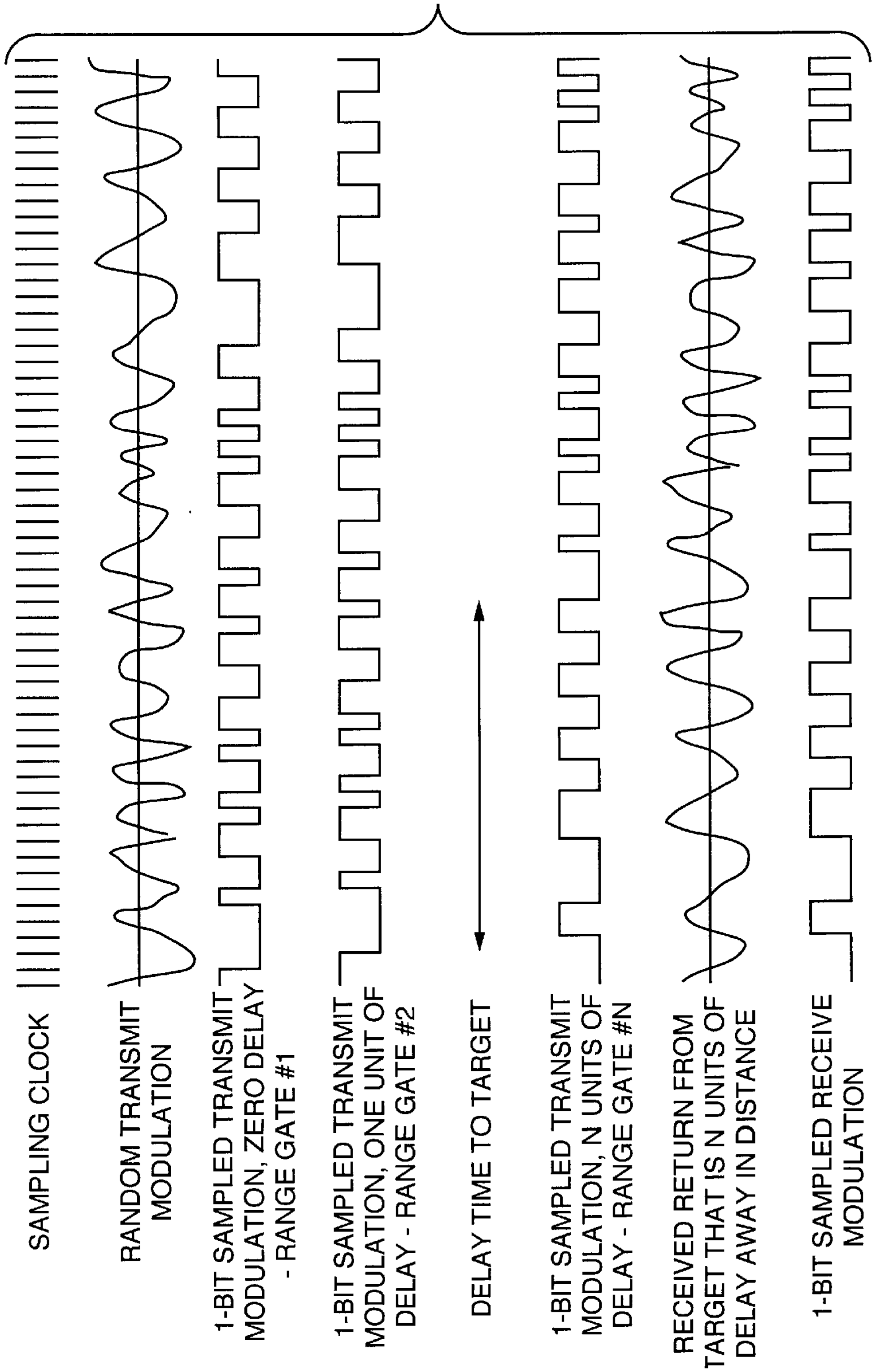
FIG. 3 shows time enlargement of the random noise waveform and sampling that may be used in the automotive radar system of FIG. 1.

More specifically, FIG. 3 shows a plot illustrating random transmit modulation and how it is digitally sampled (range gate number 1). The waveform that becomes the reference for range gate number two is the same sampled waveform delayed by one sample clock interval. Subsequent range gate signals are similarly generated. The bottom two traces in FIG. 3 show the modulation on the received return signal and its digital samples. Examination of FIG. 3 shows that the delayed signal designated range gate #N shows close correlation with the sampled return signal. Thus, there is a strong correlation in the range gate #N output.

The number of correlations of the return signal for each of the range gate sampled waveforms are counted over a period of time known as a correlation interval, shown in the bottom trace in FIG. 2. At the end of each correlation interval, the correlation counts for each individual range gate signal are passed to the digital signal processor 33. N correlation intervals comprise one coherent signal processing interval. At the end of a coherent correlation interval, there is an N-length array of correlation time samples resident in the digital signal processor 33 for each range gate. A fast Fourier transform is performed in the digital signal processor 33 on the data for each range gate yielding the frequency spectral data in each range gate. This data is then examined to determine the presence of radar reflectors (other vehicles) at each range and their associated velocity (Doppler frequency).

Figure 4:
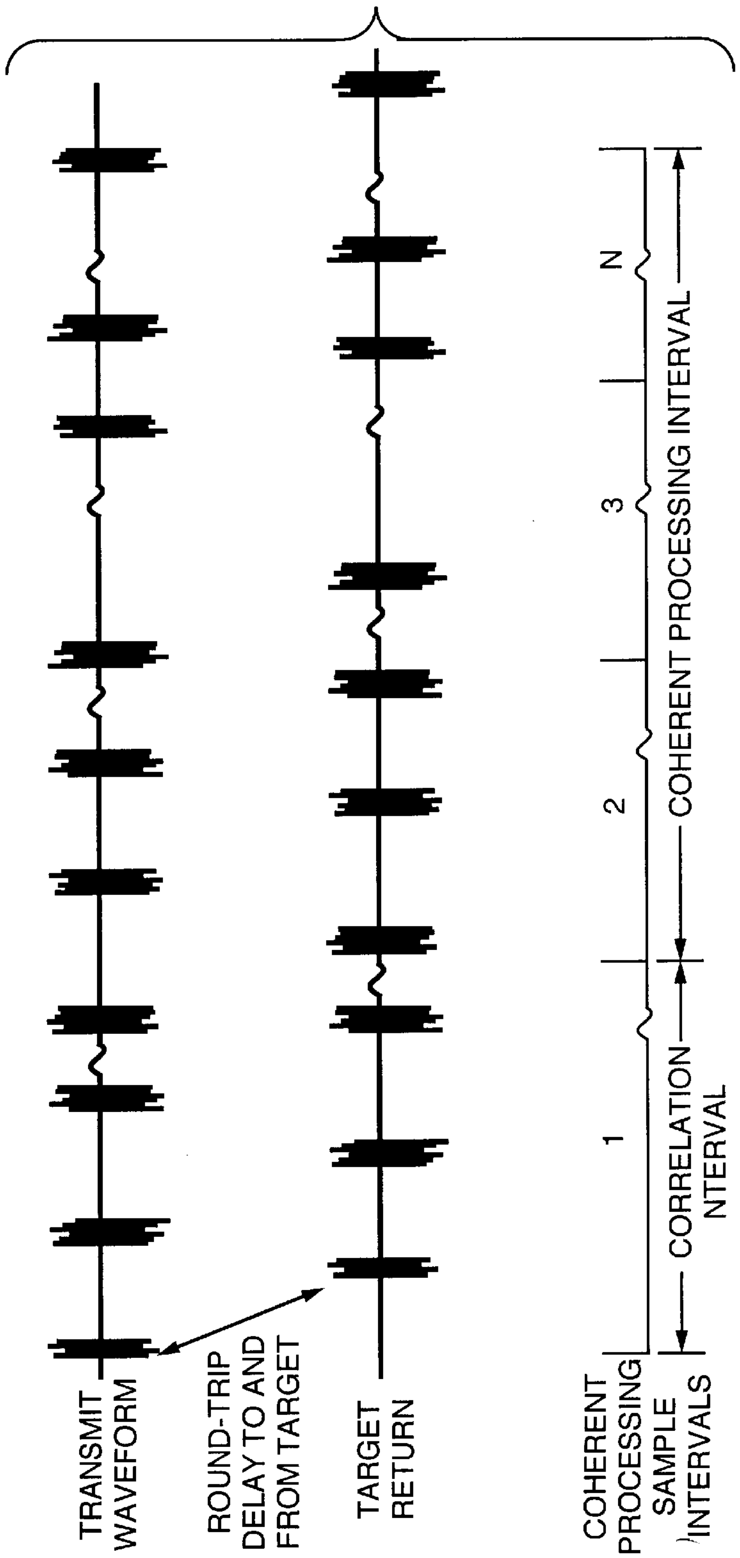
FIG. 4 shows a pulsed random noise waveform that may be used in the automotive radar system of FIG. 1.
Figure 5:
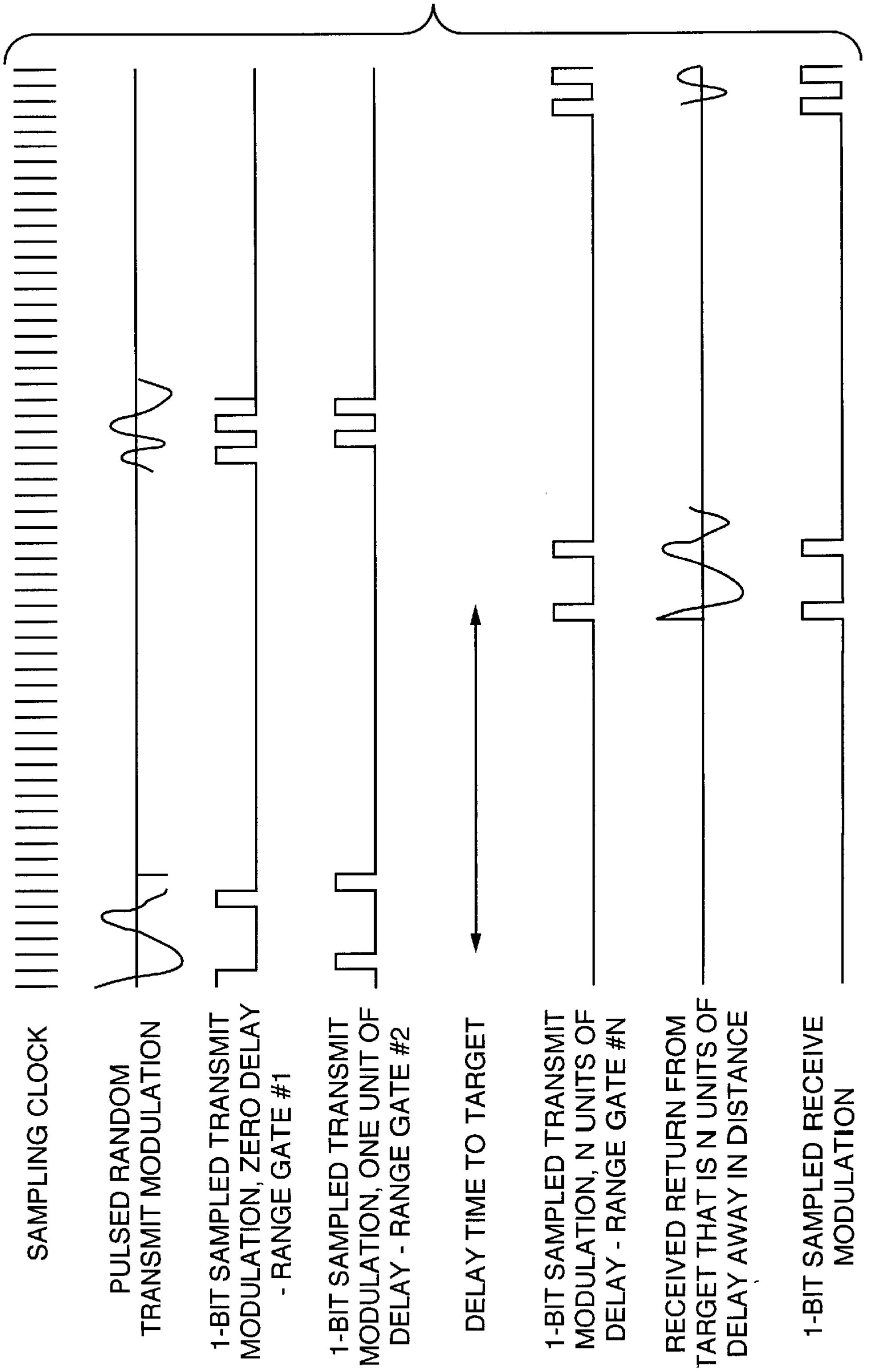
FIG. 5 shows time enlargement of the pulsed random noise waveform and sampling that may be used in the automotive radar system of FIG. 1.

The second waveform is random noise that is pulsed on and off at a predetermined duty cycle and pulse repetition frequency. Pulse-envelope parameters are selected such that the required minimum and maximum detection ranges are achieved, and so that the velocity (Doppler frequency) ambiguity resulting from the pulse repetition frequency is greater than the maximum required closing velocity between the parent and target vehicles that the automotive radar system 10 is to unambiguously detect. For this pulsed random noise waveform, there is no resulting ambiguous range since the noise modulation never repeats. There are, however, ranges corresponding to the pulse repetition time where detection is diminished because the receiver 20 is gated off during the transmission of another noise pulse. Details of this waveform are shown in FIGS. 4 and 5, which are similar to those shown in FIGS. 2 and 3.

In pulsed operation, sampling in the receiver 20 is inhibited during the time of the transmit noise pulse, because the leakage of the transmit signal directly into the receiver 20, when there is insufficient isolation between the transmit and receive antennas 15, 21, would desensitize the target detection process. If required, greater isolation of the microwave receiver 20 during the pulse transmission time may be accomplished by other techniques, such as gating off the local oscillator reference 12 to the homodyne receiver down converter 23 in the receiver 20. This results in a decrease in detection capability in pulse-mode operation by a factor equal to the transmit duty cycle (the ratio of the transmit pulse length to the pulse repetition period).

Detection capability in this type of wideband radar system 10 is limited by the time-bandwidth product (TB) of the automotive radar system 10. If in continuous mode, for example, the coherent data collection interval is 2 milliseconds and the noise bandwidth/sample rate is 250 MHz, then TB=2 milliseconds×250 MHz=500,000 or 57 dB. The signal-to-noise ratio (SNR) required for detection of the minimal required target size is a function of system parameters. If, for example, the detection threshold is set to an SNR of 13 dB, then the excess detection margin is 57−13=44 dB. Because the single-bit detection scheme limits on the largest signal in the field-of-view, this indicates that objects with a 44 dB (a factor of 25,000) smaller radar cross section than the total effective cross section of all interfering objects in the field of view can be detected. For pulsed mode, TB is decreased by an amount equal to the duty cycle.

The actual performance of the automotive radar system 10 depends upon all system parameters, but the above example shows that the random noise radar system 10 can detect a wide range of target sizes and maintain the advantages provided by the use of a random noise waveform. Any number of targets at varying ranges and velocities can be detected in a single coherent processing interval without the problem of ghost detections or fratricide problems caused by other vehicles with similar or different signal characteristics.

Thus, random noise based automotive radar systems for use in vehicular applications including automotive control systems such as collision avoidance and smart cruise control systems, and the like, have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Radar apparatus for use with a vehicle, said apparatus comprising:

a random noise radar system for generating output signals that are indicative of the range and closing velocity of objects detected by the radar system that are in the vicinity of the vehicle, wherein the random noise radar system comprises a random noise source, a transmitter coupled to the random noise source for transmitting a random noise signal, a homodyne receiver, single bit analog to digital conversion means coupled to the random noise source and to the receiver, a complex random noise correlator coupled to the single bit analog to digital conversion means for controlling the sampling rate thereof, and for generating a plurality of range gates, and a digital signal processor coupled to the correlator for cross correlating modulation samples from the signal return with delayed images of the sampled transmit modulation to produce a plurality of range rate output signals that are indicative of the range and closing velocity of detected objects; and a vehicle control system coupled to the random noise radar system for processing the output signals produced by the radar system to generate control signals that are responsive to the relative range and closing velocity of the objects detected by the radar system.

2. The radar apparatus of claim 1 wherein the vehicle control system processes the output signals from the radar system to activate an alarm.

3. The radar apparatus of claim 1 wherein the transmitter comprises:

a reference noise source at the operating frequency of the system;

a transmit amplifier coupled to the output of the noise source;

a transmit antenna coupled to the output of the transmit amplifier; and a down converter coupled to the transmit power amplifier.

4. The radar apparatus of claim 1 wherein the homodyne receiver comprises:

a receive antenna;

a limiter-attenuator-amplifier network coupled to the receive antenna; and a homodyne receiver down converter driven by the local oscillator.

5. The radar apparatus of claim 3 wherein the random noise source is hard limited before being coupled to the second port of the transmitter mixer.

6. The radar apparatus of claim 1 wherein the modulation on the return signal and the transmit modulation are sampled in the analog to digital conversion means at a rate less than or equal to twice the bandwidth of the noise modulation.

7. The radar apparatus of claim 1 wherein the random noise source outputs a continuous random noise signal.

8. The radar apparatus of claim 1 wherein the random noise source outputs a pulsed random noise signal.

9. The radar apparatus of claim 3 wherein the random noise source outputs a noise signal whose spectrum is centered at the desired RF operating frequency, which noise signal is directly coupled into the transmit amplifier.

10. The radar apparatus of claim 1 wherein the vehicle control system processes the output signals from the radar system to control the vehicle to avoid collision with detected objects.

11. Radar apparatus comprising:

a random noise radar system comprising:

a transmitter comprising:

a noise source at the operating frequency of the system;

a transmit amplifier coupled to the output of the noise source;

a transmit antenna coupled to the output of the transmit amplifier; and a down converter coupled to the transmit power amplifier;

a random noise source coupled to a second port of the transmitter mixer;

a homodyne receiver comprising:

a receive antenna;

a limiter-amplifier-attenuator network coupled to the receive antenna; and a homodyne receiver down converter driven by the local oscillator;

single bit analog to digital conversion means coupled to the random noise source by way of the down converter;

a complex random noise correlator coupled to the single bit analog to digital conversion means for controlling the sampling rate thereof, and for generating a plurality of range gates; and a digital signal processor coupled to the correlator for cross correlating modulation samples from the signal return with delayed images of the sampled transmit modulation to produce a plurality of range gate output signals that are indicative of the range and closing velocity of objects detected by the radar system; and a vehicle control system coupled to the automotive radar system for processing the output signals produced by the radar system to generate a control signal that is responsive to the relative range and closing velocity of objects detected by the radar system.

12. The radar apparatus of claim 11 wherein the vehicle control system processes the output signals from the radar system 10 to activate an alarm.

13. The radar apparatus of claim 11 wherein the random noise source is hard limited before being coupled to the second port of the transmitter mixer.

14. The radar apparatus of claim 11 wherein the modulation on the return signal and the transmit modulation are respectively sampled in the samplers at a rate less than or equal to twice the bandwidth of the noise modulation.

15. The radar apparatus of claim 11 wherein the random noise source outputs a continuous random noise signal.

16. The radar apparatus of claim 11 wherein the random noise source outputs a pulsed random noise signal.

17. The radar apparatus of claim 11 wherein the vehicle control system processes the output signals from the radar system 10 to control the vehicle to avoid collision with detected objects.

* * * * *